United States Patent [19]

Monot

[11] Patent Number: 4,605,108
[45] Date of Patent: Aug. 12, 1986

[54] DEVICE FOR RELEASING A ROTATIONAL-LOCKING ACTUATING MEMBER

[75] Inventor: Bernard Monot, Aubervilliers, France

[73] Assignee: Faiveley Entreprises, Saint Ouen, France

[21] Appl. No.: 484,418

[22] Filed: Apr. 12, 1983

[30] Foreign Application Priority Data

Apr. 21, 1982 [FR] France ................................. 82 06817

[51] Int. Cl.⁴ ............................................. E05C 15/02
[52] U.S. Cl. ............................ 192/0.02 R; 192/0.084; 192/93 A; 192/94; 192/95; 74/625; 49/139; 49/362; 49/449
[58] Field of Search ............ 192/0.02 R, 0.084, 0.096, 192/93 A, 94, 95; 49/139, 140, 362, 449; 74/625

[56] References Cited

U.S. PATENT DOCUMENTS

| | | | |
|---|---|---|---|
| 1,008,309 | 11/1911 | Cushman | 192/93 A |
| 1,024,582 | 4/1912 | Jones | 49/362 |
| 1,139,905 | 5/1915 | Pitts | 49/362 |
| 1,315,053 | 9/1919 | Teel | 192/0.02 R |
| 1,975,961 | 10/1934 | Lindeman | 192/93 A |
| 2,548,847 | 4/1951 | Rossmann et al. | 74/625 |
| 2,574,204 | 11/1951 | Woody et al. | 192/93 A |
| 3,343,302 | 9/1967 | Browning et al. | 49/362 |
| 3,745,705 | 7/1973 | Reddy | 49/362 |
| 4,198,786 | 4/1980 | Monot | 49/362 |
| 4,440,050 | 4/1984 | Kagerer | 74/625 |

FOREIGN PATENT DOCUMENTS 36105 12/1885 Fed. Rep. of Germany .
1159707 12/1963 Fed. Rep. of Germany .

Primary Examiner—Rodney H. Bonck
Assistant Examiner—Richard M. Lorence
Attorney, Agent, or Firm—Young & Thompson

[57] ABSTRACT

A rotational-locking member such as an endless screw for actuating a sliding door by means of a nut is locked in position by rotational displacement of the nut and is unlocked by means of a device comprising a pulley coupled to the endless screw and rigidly fixed to a clutch-disk. A second clutch-disk slidably mounted on a square sleeve of a bevel-pinion can be rotated by means of a pair of bevel-pinions and a lever. A lug of the second disk cooperates with a helical groove of a stationary cam in order to subject the disk to a helical movement, the rotational motion component of which is imparted to the endless screw after engagement of the disks in order to unlock the screw.

7 Claims, 15 Drawing Figures

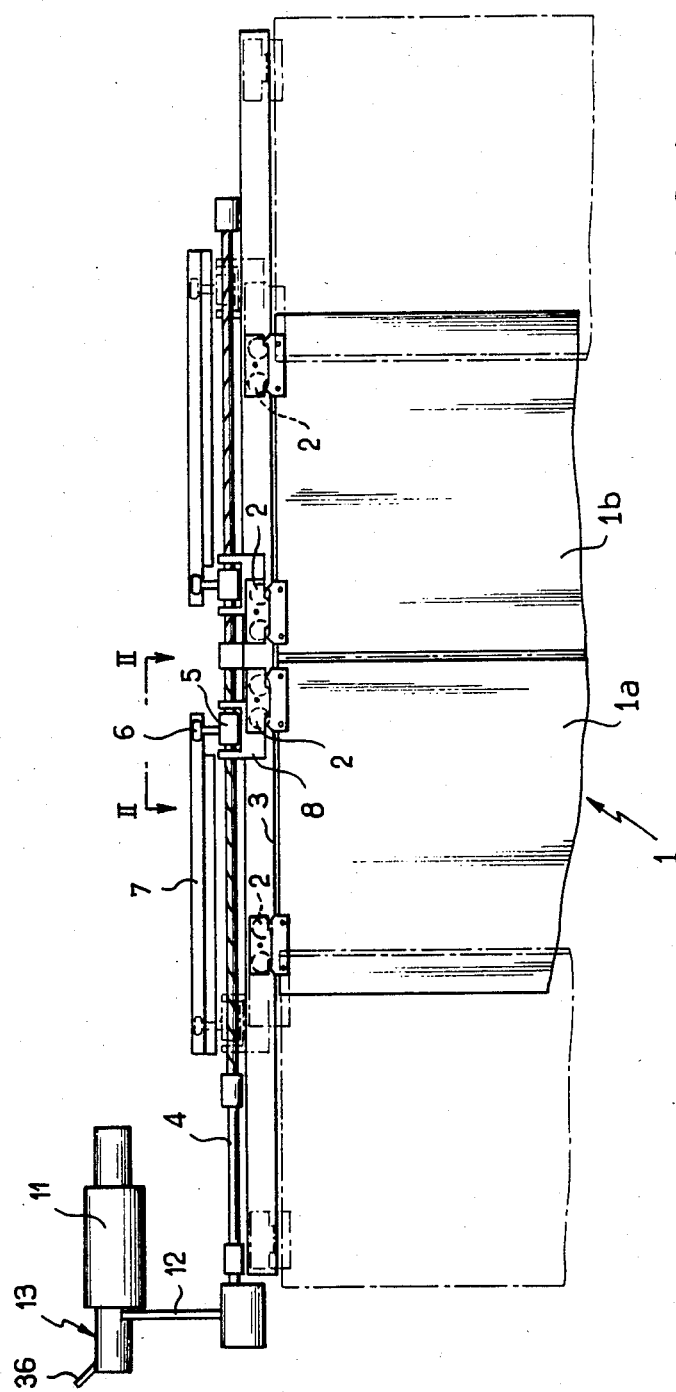
FIG_1
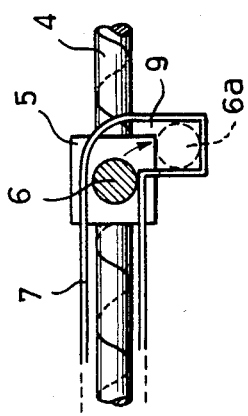
FIG_2

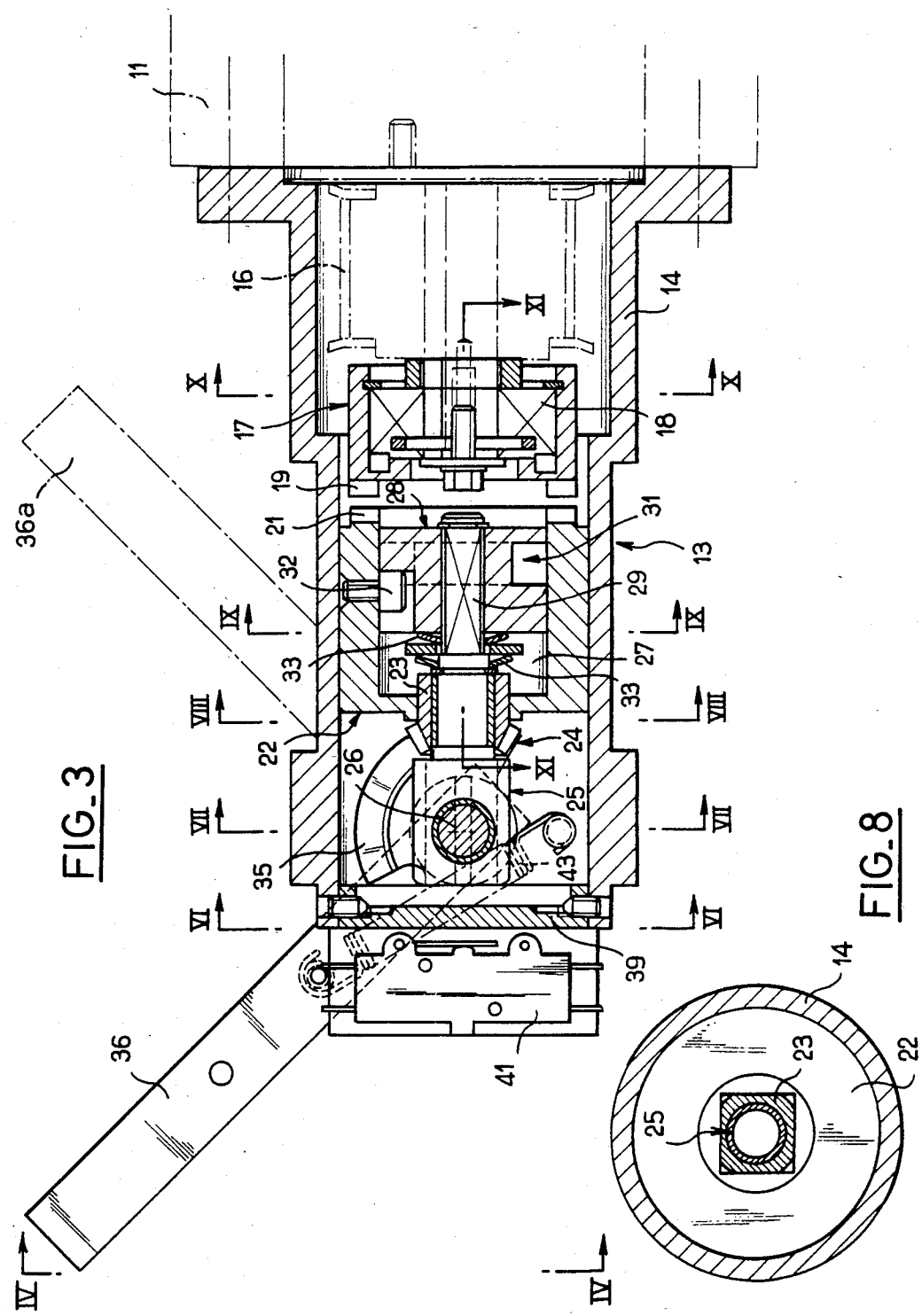
FIG_3
FIG_8

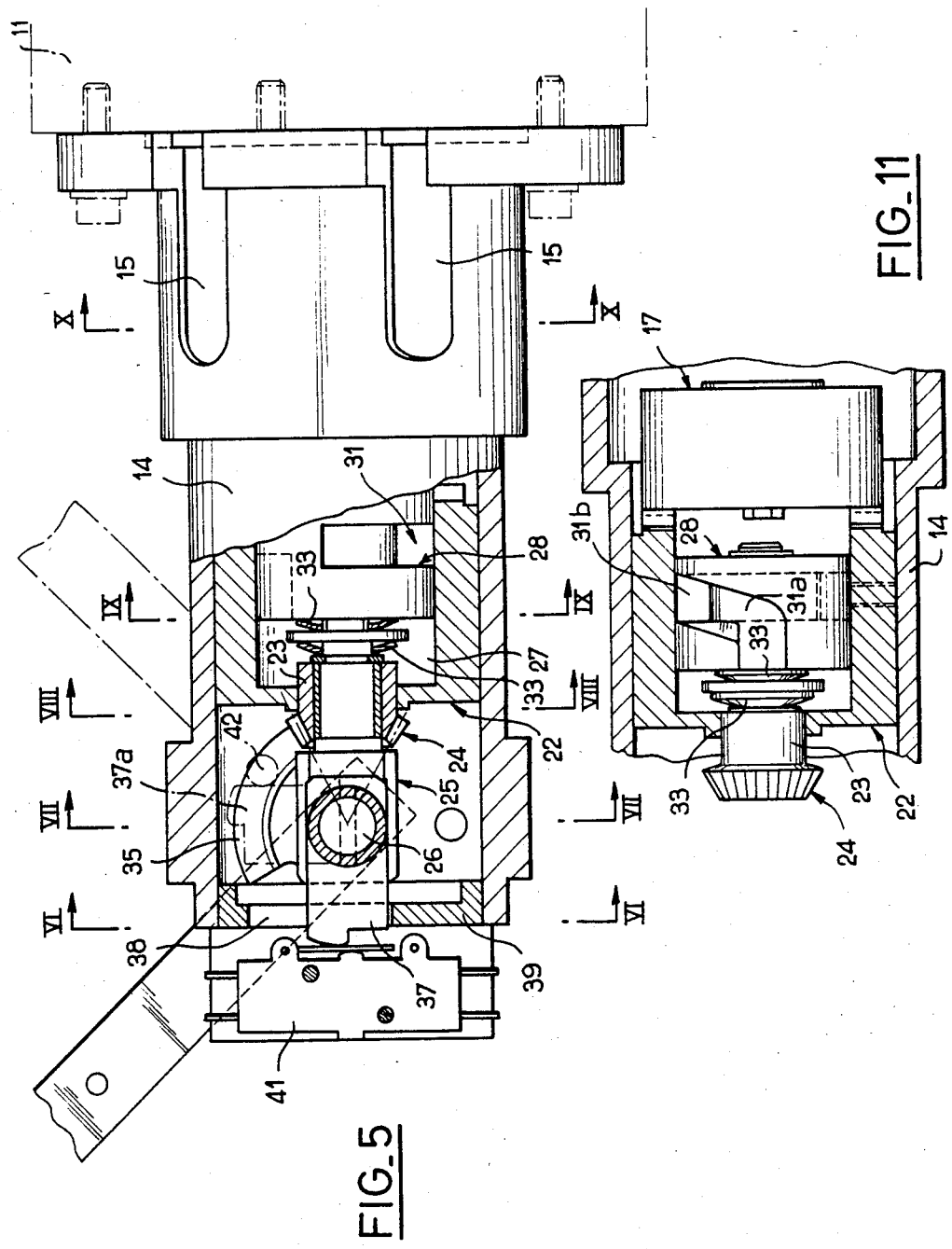

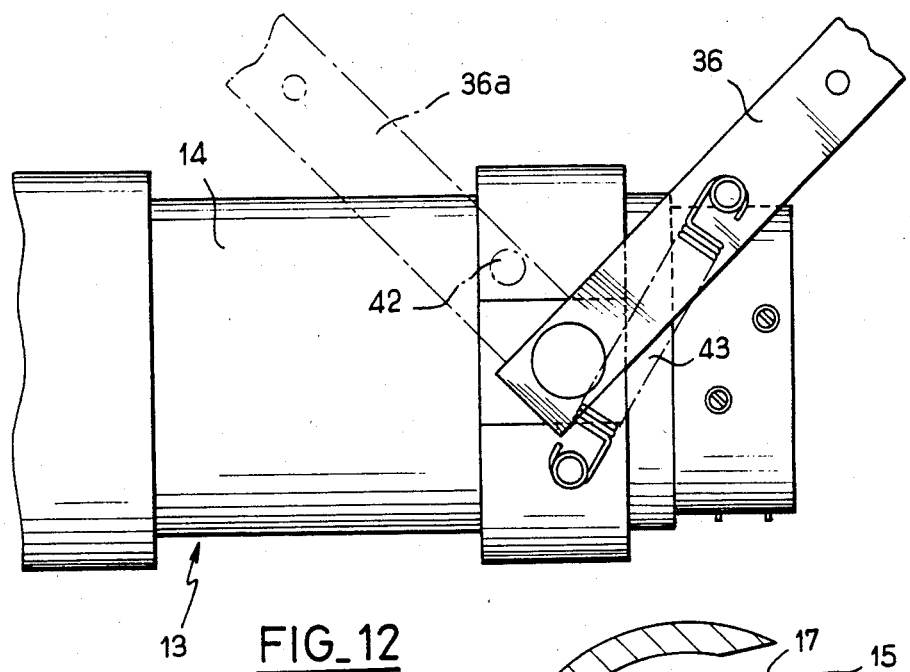
FIG_12
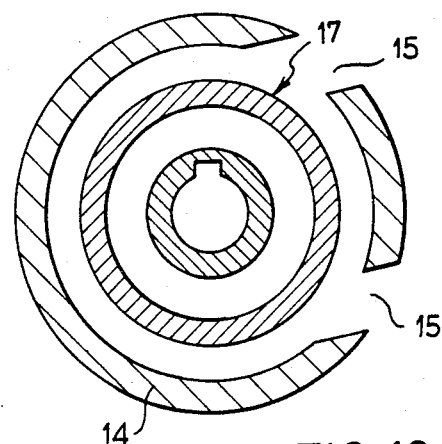
FIG_10
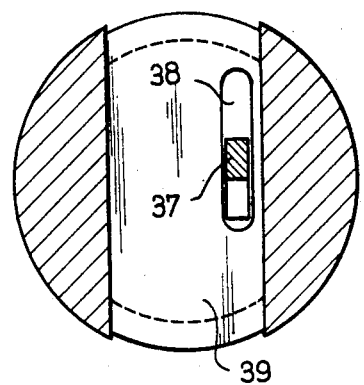
FIG_6
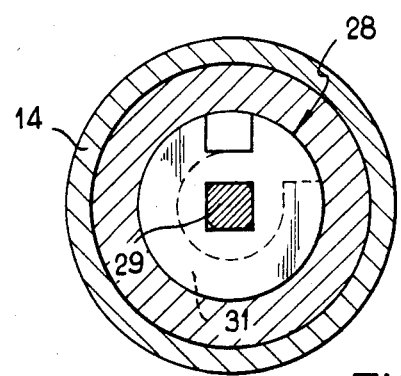
FIG_9

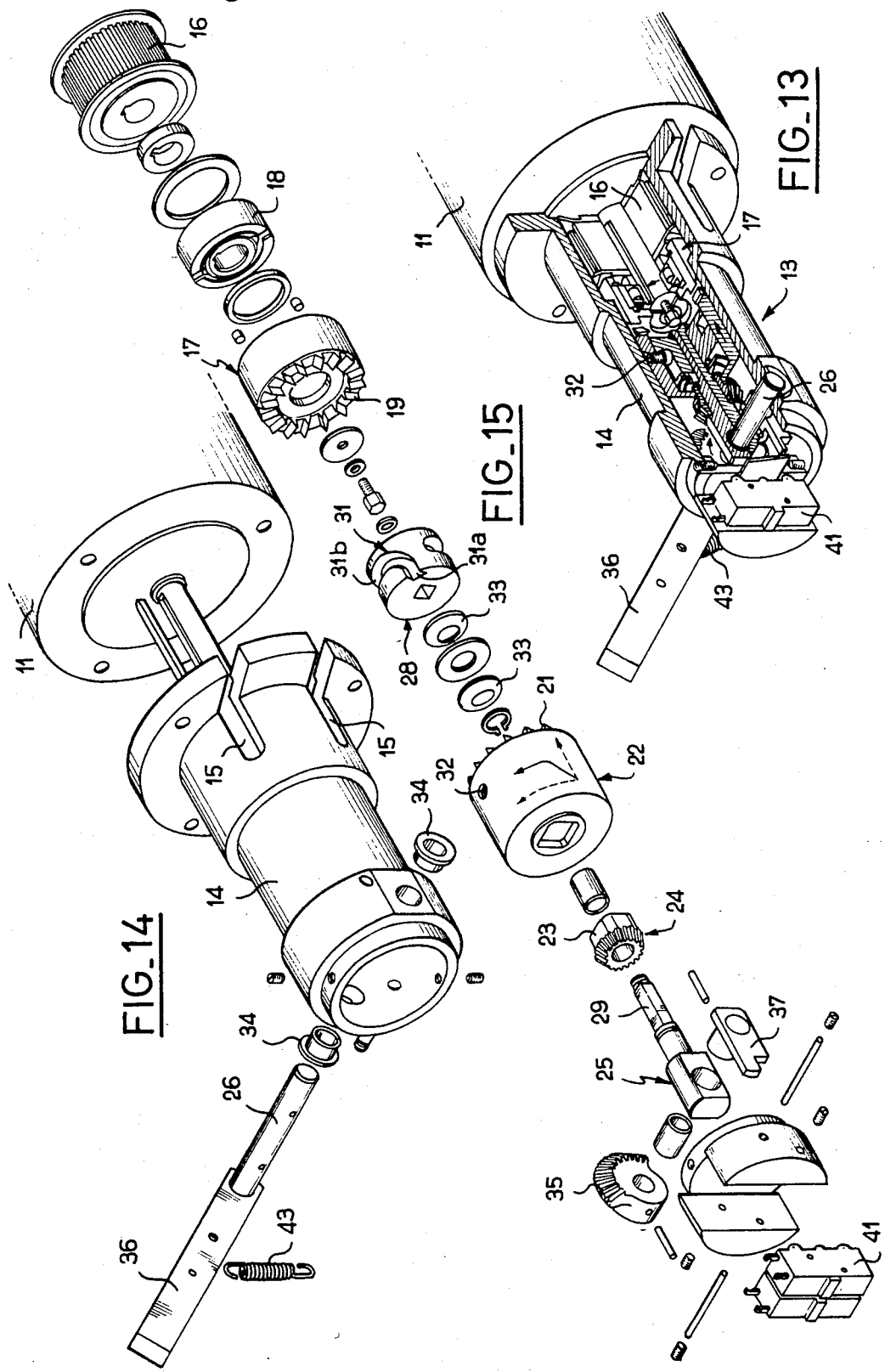

DEVICE FOR RELEASING A ROTATIONAL-LOCKING ACTUATING MEMBER

This invention relates to an unlocking device for releasing a rotational-locking actuating member.

A device of this type is primarily although not exclusively applicable to the unlocking of a sliding door fitted with a nut which cooperates with a reversible endless screw actuated by a motor for the operation of said door. The specified door further comprises a locking system of the type described in French patent No 78 00442L This system comprises a projecting member formed on the nut and a guide which is parallel to the screw for guiding the projecting member and preventing rotation of the nut when the screw rotates. A lateral cavity is formed in the guide in the vicinity of one end of travel of the nut in order to receive the projecting member and thus prevent translational displacement of the nut.

Assuming that the door is thus locked in the closed position, it is only necessary in order to release the door to rotate the screw in the direction of opening, thus driving the nut in rotation and withdrawing the projecting member from the cavity. The same procedure takes place when the door is locked in the open position.

An unlocking action of this type is therefore essentially dependent on the screw-actuating motor and is inoperative in the event of a failure of the power supply. To equip said motor with a releasable hand-control system would be complex and of little real assistance since the motor is usually difficult to reach. Finally, the releasing operation itself does not have any influence on the position of the door, which is liable to have a regrettable psychological effect on persons who may be accidentally shut-in.

The object of the present invention is to provide a simple hand-operated unlocking device which is readily accessible and the effect of which is immediately perceptible.

This result is obtained in accordance with the invention by means of a system for clutch-engagement of coaxial disks in which a first disk is connected to the rotational locking member and in which a second disk is connected to a manual control member through a cam system in order to subject said second disk to a movement having a translational component and a rotational component.

The clutch-engagement operation produced by the manual control member is accompanied by a movement of rotation which has the effect of releasing the rotational-locking member. In the event that said member is an endless screw in cooperating relation with a nut for actuating a door, said movement of rotation produces an incipient translational movement which results in partial opening of the door and shows the operator that his operation has proved successful.

A further advantage of the invention is that the device can readily be operated by personnel. It is only necessary to connect the manual control member to a handle located within reach of personnel by means of any suitable remote control device such as a connecting-rod system, for example.

The first disk is advantageously coupled axially with the motor for actuating the rotational locking member, with the result that the remote-control coupling device mentioned above has the double function of unlocking control and control of normal operation of the locking member such as the door-actuating screw, for example.

In accordance with one practical embodiment of the invention, the cam system comprises a lug rigidly fixed to the second disk and adapted to cooperate with a substantially helical groove formed in a stationary part.

The movement controlled by the manual member is at the outset essentially a translational movement of engagement and then becomes a rotational movement of release at the end of travel.

Other features of the invention will be more apparent upon consideration of the following description and accompanying drawings, wherein:

FIG. 1 is a view in elevation of a sliding door controlled by an endless screw and provided with an unlocking device in accordance with the invention;

FIG. 2 is a fragmentary plan view to a larger scale and taken along line II—II of FIG. 1;

FIG. 3 is an axial longitudinal sectional view of the unlocking device, this cross-section being taken along line III—III of FIG. 4;

FIG. 5 is a longitudinal sectional view displaced off-center and taken along line V—V of FIG. 4;

FIG. 6 is a sectional view taken along line VI—VI of FIGS. 4 and 5;

FIG. 8 is a sectional view taken along line VIII—VIII of FIGS. 3 and 5;

FIG. 9 is a sectional view taken along line IX—IX of FIGS. 3 and 5;

FIG. 10 is a sectional view taken along line X—X of FIGS. 3 and 5;

FIG. 11 is a fragmentary longitudinal part-sectional plan view taken along line XI—XI of FIG. 3;

FIG. 12 is a view in elevation taken along line XII—XII of FIGS. 4 and 7;

FIG. 13 is a part-sectional view in perspective;

FIG. 14 is a partially exploded view in perspective;

FIG. 15 is an exploded view of the internal elements of the device.

Figures 4, 7:
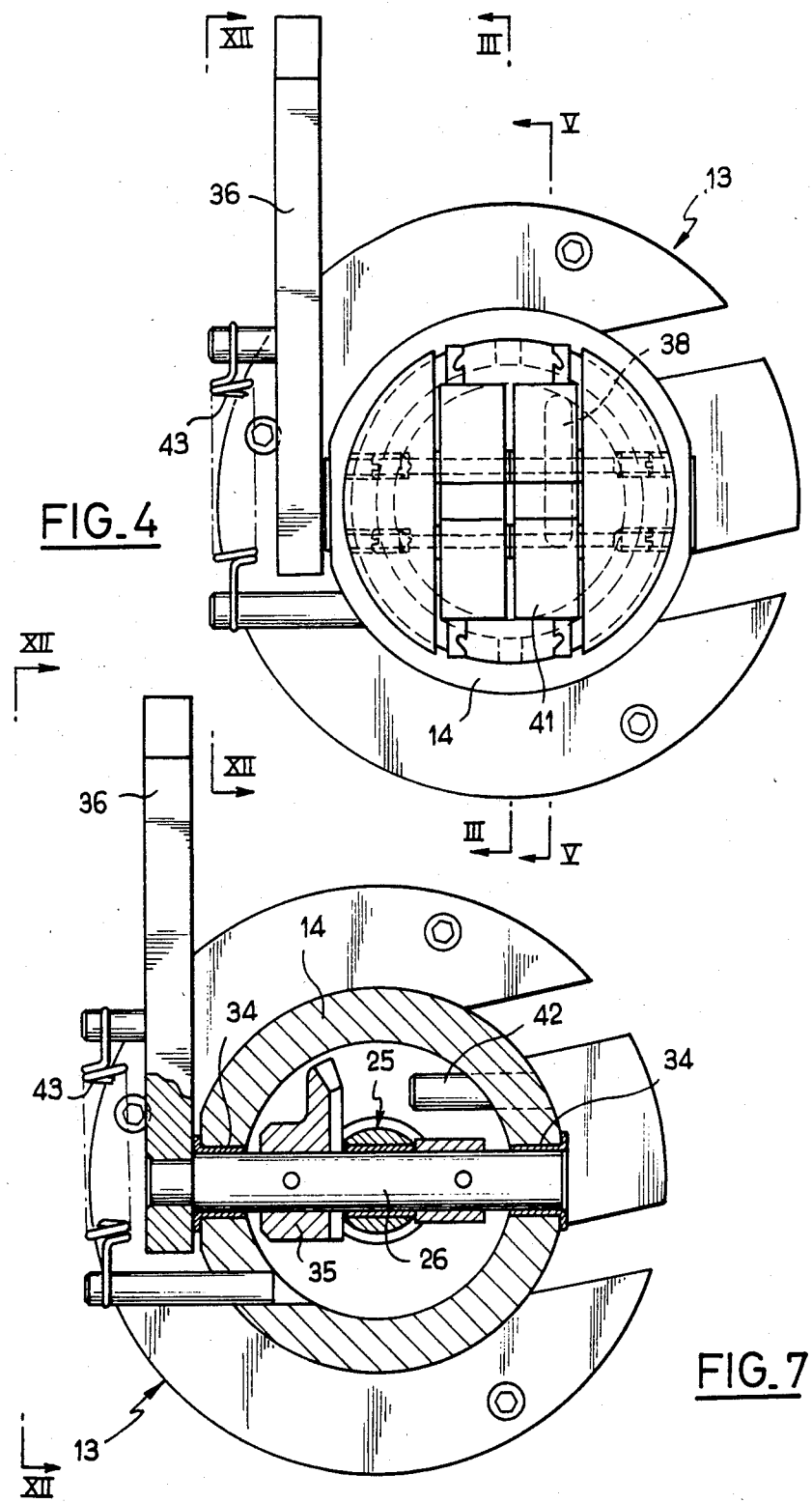
FIG. 4 is an end view taken along line IV—IV of FIG. 3.
FIG. 7 is a sectional view taken along line VII—VII of FIGS. 3 and 5.

Referring to FIGS. 1 and 2, a sliding door 1 shown in the closed position comprises two door-leaves 1a, 1b suspended by means of rollers 2 from a track 3. The open position of the sliding door is shown in chain-dotted lines.

An endless screw 4 is adapted to cooperate with a nut 5 which carries a projecting member 6, said member being fitted within a guide 7 which is parallel to the screw 4. The nut 5 is thus secured against rotation and is capable only of displacement in translational motion along the axis of the screw.

Each nut 5 is mounted within a fork 8 which is rigidly fixed to one door-leaf, with the result that the translational motion of the nut is imparted to the door-leaf.

At a point located near the end of travel of the nut, a lateral cavity 9 is formed in the guide 7 (as shown in FIG. 2), with the result that the projecting member 6 is thus capable of engaging within said cavity at 6a under the rotational action of the screw. From the moment of engagement, the door-leaf is locked in position and can be released only by rotating the screw in the opposite direction, which has the effect of withdrawing the projecting member 6 from the cavity 9.

The endless screw 4 is driven by an electric motor 11 and is coupled to said motor by means of a driving-belt 12. An unlocking device 13 in accordance with the invention is coupled axially with the motor 11.

The unlocking device 13 will now be described in detail with reference to FIGS. 3 to 15.

Said device comprises a casing 14 bolted to the frame of the motor 11 and provided with slots 15 through which the driving-belt 12 passes. A pulley 16 is keyed on the driving shaft of the motor and is adapted to cooperate with the driving-belt 12. On said shaft is also fixed a first clutch disk 17 which is coupled to the shaft by means of a free-wheel device 18 of known type. By virtue of this arrangement, when the disk 17 is driven in rotation in a given direction, it actuates the motor at the same time (assuming that the current supply to the motor has been cut-off) and, when the motor rotates normally in the same direction, the disk 17 remains stationary.

The disk 17 has a generally cylindrical shape and is provided on the face directed axially away from the pulley 16 with bevelled teeth 19 which are adapted to cooperate with similar teeth 21 of a second clutch disk 22, said second disk being mounted so as to be capable of translational displacement on a square sleeve 23 of a bevel pinion 24. Said pinion is rotatably mounted on a stationary shaft 25 which is coaxial with the driving shaft of the motor. It is apparent that the movement of rotation of the pinion 24 imparts a movement of rotation to the clutch disk 22.

The shaft 25 is traversed by a transverse shaft 26 which passes through the walls of the casing 14, thus ensuring that said shaft 25 is stationarily fixed.

The disk 22 has a generally cylindrical shape and is provided with a cavity 27 which opens towards the disk 17. Within said cavity is housed a cylindrical cam 28 fixed on a square extension 29 of the shaft 25. Said cam is provided with a helical groove 31, a lug 32 which is rigidly fixed to the internal wall of the disk 22 being adapted to cooperate with said helical groove.

Resilient washers 33 permit a slight axial displacement of the cam 28 in order to obtain smooth cooperation with the lug 32.

When the pinion 24 is caused to rotate, it drives the disk 22 in rotation. However, under the action of cooperation of the lug 32 with the helical groove 31 of the stationary cam 28, said movement of rotation of the disk 45 is accompanied by a translational motion component which tends to displace the disk 22 towards the disk 17 in order to cause engagement of the two disks (as shown in FIG. 11). In this position, the disk 22 has completed its range of translational displacement on the sleeve 23 of the pinion 24.

It will be noted that the helical groove 31 is in fact provided with two successive tracks 31a, 31b (as shown in FIGS. 11 and 15). One track has a coarse pitch and the other track has a substantially zero or very fine pitch, with the result that the disk 22 is driven first in a helical movement of engagement, then in a movement of rotation which is also imparted to the disk 17. This movement has been drawn on the disk 22 (FIG. 15).

The transverse shaft 26 is rotatably mounted in journal bearings 34 fixed in the wall of the casing 14 and carries a bevel pinion 35 which is adapted to cooperate with the pinion 24. Outside the casing 14, the shaft 26 also carries an operating lever 36 for performing the unlocking operation. In the figures, the lever 36 is shown in the rest position and therefore in the position of disengagement of the clutch disks. The active unlocking position 36a is shown in chain-dotted lines.

The transverse shaft 26 also carries a cam 37 (as shown in FIG. 5) which is keyed on said shaft and may be so arranged as to project from the casing through a window 38 formed in the end-wall 39 of the casing in order to actuate a switching unit 41. Said unit is connected electrically to the motor in order to cut-off the supply of current to said motor in the active position 36a of the lever corresponding to a withdrawn position 37a of said cam.

A pivot 42 fixed in the casing serves as a support for the cam in position 37a in order to constitute an end-of-travel stop for the shaft 26.

A spring 43 attached to the casing 14 and to the lever 36 ensures stability of the end positions of said lever 36.

Assuming that the door 1 is closed and locked as described earlier, that the projecting member 6 is accordingly engaged within the cavity 9 and that the lever 36 is in the rest position, the fact of moving said lever to position 36a first has the effect of interrupting the current supply to the motor, whether the supply has already been cut-off or not. The pinion 35 rotates in the clockwise direction (in FIGS. 3 and 5), thus driving the pinion 24 in the anticlockwise direction (as shown in the different cross-sections). By means of the square portion of the sleeve 23, a rotational motion component is applied to the clutch disk 22. However, the lug 32 is constrained to follow the helical groove 31 of the cam 28 which is maintained stationary on the square portion 29 of the axial shaft 25. The translational motion component of the disk 22 is permitted by the axial sliding displacement on the square portion of the sleeve 23.

At the beginning of the movement, the helical displacement of the disk 22 causes this latter to engage with the disk 17 which in turn drives the unexcited motor, the pulley 16, and therefore the screw 4. This movement is followed by a continuation of the movement of rotation, which in turn results in withdrawal of the projecting member 6 from the cavity 9 and in partial opening of the door.

One advantage of the device is that it can be actuated from any desired location by means of a remote-control connection such as a link-rod system, for example, between the operating lever 36 and a handle which is within reach of personnel.

A further advantage is that the door can not only be unlocked but also partially opened, thus showing the user that the unlocking operation has actually taken place and enabling him to continue to open the door by inserting his hand within the gap formed between the two door-leaves.

As will readily be apparent, the invention is not limited to the example hereinabove described but extends to any technological alternative within the capacity of anyone versed in the art. Furthermore, the invention applies to unlocking of any rotational-locking member since the case of a door actuated by means of an endless screw constitutes only one example of application.

What is claimed is:

1. An unlocking device for releasing a rotationally-locking actuating member, comprising a nut (5) mounted on an endless screw (4) connected to a motor (11), said unlocking device comprising a freewheel (18) connected to said endless screw (4) and positioned relatively thereto for driving said endless screw (4) when said freewheel (18) is itself driven according to a driving movement in an unlocking direction with respect to said endless screw (4), said freewheel (18) being connected to a first clutch disk (17) of a clutch device comprising two clutch disks, a second clutch disk (22) of said clutch device being connected to a manual control member (36) through a cam system (28, 32) in order to subject said second clutch disk (22) to a movement having a translational motion component and a rotational motion component upon actuation of said manual control member.

2. A device according to claim 8, wherein the first disk is coupled axially with the motor for actuating the rotational locking member.

3. A device according to claim 8, wherein the second disk is slidably mounted for free axial displacement and connected mechanically to the manual control member in order to be driven in rotation.

4. A device according to claim 3, wherein the cam system comprises a lug rigidly fixed to the second disk and adapted to cooperate with a substantially helical groove formed in a stationary part.

5. A device according to claim 4, wherein the helical groove is provided with two tracks having different pitches.

6. A device according to claim 5, wherein the manual control member comprises a lever connected to the second disk by means of a system of bevel pinions.

7. A device according to claim 6, wherein said device comprises a switching unit which is responsive to the position of the manual control member in order to interrupt the supply of current to the motor when said control member is in the disk-engagement position.

* * * * *